United States Patent [19]

Stritzke

[11] Patent Number: 4,638,134

[45] Date of Patent: Jan. 20, 1987

[54] DEVICE FOR EVACUATING, FILLING AND CLOSING FINAL STORAGE CONTAINERS FOR RADIOACTIVE MATERIALS

[75] Inventor: Detlef Stritzke, Mol, Belgium

[73] Assignee: Deutsche Gesellschaft, Fed. Rep. of Germany

[21] Appl. No.: 662,344

[22] Filed: Oct. 18, 1984

Related U.S. Application Data

[62] Division of Ser. No. 343,827, Jan. 29, 1982.

[30] Foreign Application Priority Data

Feb. 7, 1981 [DE] Fed. Rep. of Germany ....... 3104366

[51] Int. Cl.$^4$ ........................ G21C 19/40; B23K 13/00

[52] U.S. Cl. .................................. 219/9.5; 219/85 A; 376/272

[58] Field of Search .......... 376/272; 219/85 A, 10.53, 219/59.1, 9.5; 220/67; 250/506.1, 507.1; 252/628, 629

[56] References Cited

U.S. PATENT DOCUMENTS

| | | | |
|---|---|---|---|
| 2,397,370 | 3/1946 | Raven | 220/67 |
| 2,480,376 | 8/1949 | Martin | 220/67 X |
| 2,503,429 | 4/1950 | Ziegler | 219/85 A |
| 2,579,466 | 12/1951 | Birkland | 220/67 X |
| 2,620,939 | 12/1952 | Weisgerber | 53/317 |
| 2,762,193 | 9/1956 | Johnson | 220/67 X |
| 2,937,481 | 5/1960 | Palmer | 53/478 |
| 3,327,892 | 6/1967 | Lloyd et al. | 220/67 |
| 3,460,310 | 8/1969 | Adcock et al. | 53/478 |
| 3,815,314 | 6/1974 | Pollock et al. | 53/420 |
| 3,860,778 | 1/1975 | Rudd et al. | 219/67 |
| 4,094,460 | 6/1978 | Scanga et al. | 220/258 |
| 4,139,488 | 2/1979 | Knotik et al. | 252/628 |
| 4,171,002 | 10/1979 | Smith | 250/506 |
| 4,254,891 | 3/1981 | Jeppsson | 220/355 |
| 4,278,892 | 7/1981 | Baatz et al. | 376/272 X |
| 4,341,547 | 7/1982 | Heimerl | 65/165 |
| 4,445,042 | 4/1984 | Baatz et al. | 376/272 X |

FOREIGN PATENT DOCUMENTS

| | | | |
|---|---|---|---|
| 0044692 | 1/1982 | European Pat. Off. | 252/629 |
| 0077955 | 5/1983 | European Pat. Off. | 376/272 |
| 1132569 | 11/1968 | United Kingdom . | |
| 1374168 | 11/1974 | United Kingdom . | |
| 1444479 | 7/1976 | United Kingdom . | |
| 2009657 | 6/1979 | United Kingdom . | |
| 2042403 | 9/1980 | United Kingdom . | |
| 1584218 | 2/1981 | United Kingdom . | |
| 1588350 | 4/1981 | United Kingdom . | |
| 1589711 | 5/1981 | United Kingdom . | |
| 2106442 | 4/1983 | United Kingdom | 376/272 |

*Primary Examiner*—Deborah L. Kyle
*Assistant Examiner*—Dan Wasil
*Attorney, Agent, or Firm*—Allegretti, Newitt, Witcoff & McAndrews, Ltd.

[57] ABSTRACT

A device for evacuating, filling and closing final storage containers for radioactive materials mixed with molten glass, comprising a suction pipe connected to the container, a meltable closure for said pipe and a closable evacuation connection fitting mounted in said meltable closure. The container is evacuated through the fitting whereupon the fitting is sealed closed to preserve the vacuum. When the suction pipe is dipped into the molten glass to fill the container, the closure melts and with the glass is sucked into the container.

In another form the device also includes a protective sleeve surrounding the fitting, closed at its outer end with a meltable plate which also serves as a heat radiation shield. The shield prevents premature melting of the meltable closure, i.e. melting from the heat in the glass furnace prior to immersion of the suction pipe in the molten glass.

The invention also includes a closure for the filled container which may be soldered at its periphery to the container wall by induction heating to seal the container.

3 Claims, 1 Drawing Figure

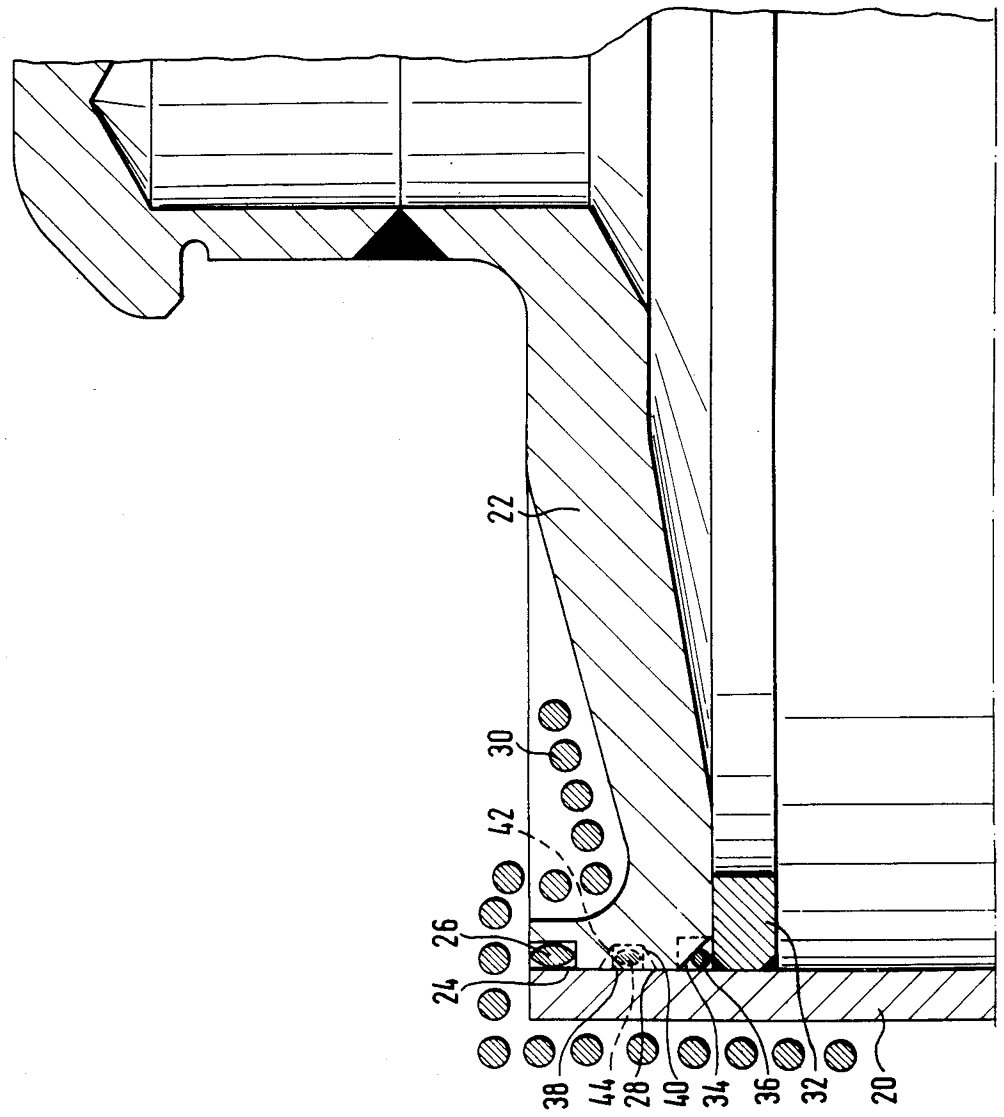
22
30
42
26
24
38
44
28
40
34
36
32
20

DEVICE FOR EVACUATING, FILLING AND CLOSING FINAL STORAGE CONTAINERS FOR RADIOACTIVE MATERIALS

This is a division of application Ser. No. 343,827, filed Jan. 29, 1982.

The invention relates to a device for closing final storage containers for radioactive materials.

After the final storage container has been filled, it must be closed gas-tight, which is usually done by means of a cover. For a container filled by way of a bottom outlet system or an overflow system or for a Vitromet container, the cover has substantially the same form and is inserted into the filled container from above. If the filling of the container takes place according to the suction method, the cover is put in from below. Then, as a rule, it has a different shape. It is the purpose of the cover to seal the remaining gas space between the surface of the radioactive glass and the cover against the atmosphere, and to produce a mechanically strong connection between the cover and the container so that the cover will carry the weight of the filled container.

The closure for the suction pipe comprises a metal plate inside the pipe at the end thereof. The plate is mechanically and thermally sturdier than the glass/-metal suction pipe closures previously used. The connection fitting is welded or soldered to the margin of an opening in the plate which guarantees good sealing for the evacuation process.

In another form of the invention, a plate closure is welded over the end of the sleeve to further increase protection of the fitting against mechanical damage. The plate closure also prevents during the dipping of the suction pipe into the hot melting furnace, premature melting of the relatively thin-walled cold-welded area of the fitting.

Openings may be provided through the wall of the sleeve to relieve excess pressure within the space between the closure in the end of the suction pipe and the surface of the glass melt during the dipping of the suction pipe into the glass melt.

It should also be pointed out that good vacuum tightness is guaranteed by the soldered, welded and especially cold-welded metal connections as defined in the invention. Moreover, these connections permit an easy later repair of possible leaks.

Since the entire device consists only of metal, defects and deficiencies based on marked differences of material are practically excluded and thereby the safety during the filling and the closing of the final storage container is improved.

For containers, which are filled by means of the suction method, it is not necessary to turn the container around for covering. By the design as defined in the invention the gas-tight closing of the container is accomplished with a minimum of operations. Remote-operated or automatically controlled welding stations in the so-called "hot range" are no longer necessary. The soldered area obtained by this further development is mechanically strong and safe. In the active range there is only a deposit table and a heating spiral or copper coil. A generator for induction heating is disposed outside the treatment cell. Mechanically moving parts as previously used in connection with the welding station are no longer necessary.

According to the invention, the periphery of the cover adjacent the inside wall of the container has recesses containing solder which is melted by an induction heating coil surrounding the joint. Gold plating of the contact surfaces may be provided in the gap between cover and container. Thereby the use of fluxing agents is minimized and the time for the soldering process can be shortened considerably.

The invention will be explained now by means of the attached drawing in which:

The sole FIGURE is a half sectional view through an end of a cylindrical container showing a cover construction for gas-tight closing a filled final storage.

The drawing shows a final storage container 20 having an annular flange or a ring 32 welded in the upper end as a stop. A cover 22 has a circumferential groove 24 which holds a shaped solder part 26 and a fluxing agent, or a shaped solder part surrounded by a fluxing agent. The contact surfaces in the gap between the cover and the container are preferably gold-plated electrolytically in order to minimize the consumption of fluxing agent and thereby shorten the time for the soldering process.

The solder, the cover and the container are inductively heated in the upper zone up to the working temperature of the solder by means of a copper coil concentrically arranged around the contact surface of the cover and the container. It is important with this arrangement that the cover be heated first to expand and press against the container. By an appropriate arrangement of the copper coil, the heat distribution between the cover and the container can be controlled. It is most favorable for the soldering process if the cover and the container surrounding the solder heat equally fast. This cover system can be employed for all types of containers.

For containers which are filled by means of the suction method, the cover is preferably put in from below so that during the turning of the container glass residues will not contaminate the environment. In this case, the cover 22 has a circular recess 34 on the cover edge opposite the recess 24. This recess 34 can be sloped—as shown—or can have the rectangular shape which is drawn by broken lines, similar to the recess 24. For covers which are put in from below, the recess 24 may be omitted. The measures for heating the container parts and cover parts around the contact surfaces are the same as those described previously for the melting of the shaped solder part 26.

In the surface of the cover 22 bounding the gap 23 additional recesses 38 may be provided. These recesses can have the shape of a rectangular annular groove or can be provided with a surface 40 inclined in the direction of flow of the solder when covering from above or 42 when covering from below. Shaped solder parts 44 are put into this recess or recesses.

What is claimed is:

1. A device for closing a metal storage container for radioactive material comprising a cover for gas-tight closing of said container an annular flange projecting from the inner wall of said container supporting said cover the outer edge of said cover having at least one recess open only toward the inside wall of said container a shaped solder part disposed in said recess an induction heater arranged around said cover and said container in the region where the cover joins the inside wall of said container for melting said solder part to seal the gap between the edge of the cover and the inside wall of said container said induction heater comprising a copper coil and control means for heating the cover faster than the container.

2. The device of claim 1 wherein the contact surfaces in the gap between the cover and container are gold coated.

3. The device of claim 1 in which said recess slants toward the outer edge of said flange.

* * * * *